United States Patent [19]

Beaton

[11] Patent Number: 4,746,087
[45] Date of Patent: May 24, 1988

[54] TILT MECHANISM FOR DISPLAY TERMINAL

[75] Inventor: Larry G. Beaton, Garner, N.C.

[73] Assignee: International Business Machines Corporation, Armonk, N.Y.

[21] Appl. No.: 32,118

[22] Filed: Mar. 30, 1987

[51] Int. Cl.⁴ .......................................... A45D 19/04
[52] U.S. Cl. .................................... 248/1 I; 248/360; 248/456
[58] Field of Search ............... 248/649, 371, 398, 454, 248/455, 456, 359, 185, 360; 108/1, 6

[56] References Cited

U.S. PATENT DOCUMENTS

| | | | |
|---|---|---|---|
| 1,681,732 | 8/1928 | Gray | 248/359 |
| 2,662,333 | 12/1953 | Bargen | 248/455 |
| 4,343,450 | 8/1982 | Anderson | 248/454 |
| 4,524,940 | 6/1985 | Yurchenco | 248/359 |
| 4,546,948 | 10/1985 | Ferrara | 248/454 |
| 4,556,189 | 12/1985 | Kirpluk et al. | 248/649 |
| 4,561,620 | 12/1985 | Goetz et al. | 248/371 |

Primary Examiner—J. Franklin Foss
Attorney, Agent, or Firm—Gerald R. Woods

[57] ABSTRACT

An inexpensive tilt mechanism for a display terminal includes a pair of L-shaped rails at the bottom surface of the terminal. The rails define a channel extending from front to back at the bottom surface. At least one of the rails has a toothed surface. A movable support includes a pedestal attached to a base plate which can be shifted along the channel defined by the L-shaped rails. In a preferred embodiment, only one of the rails has a toothed surface while the pedestal has an attached lever which can be used to pivot the movable support about the other rail until it clears the teeth. In this disengaged position, the movable support can be shifted along the channel.

7 Claims, 5 Drawing Sheets

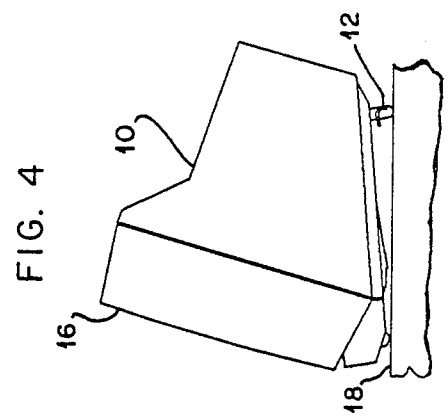
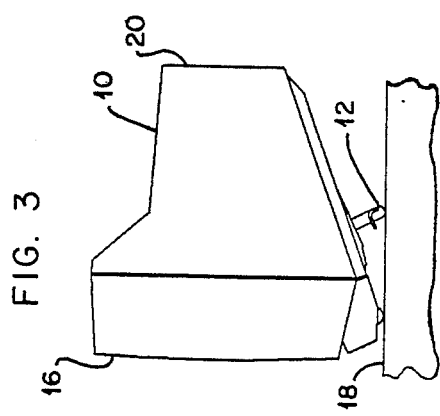
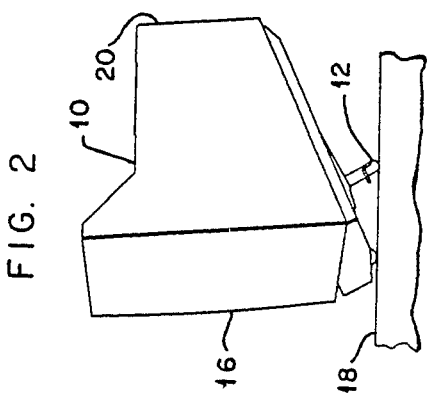

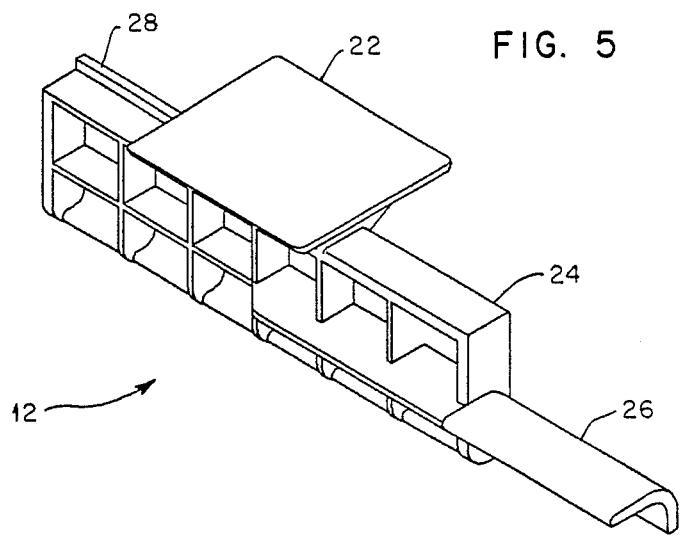
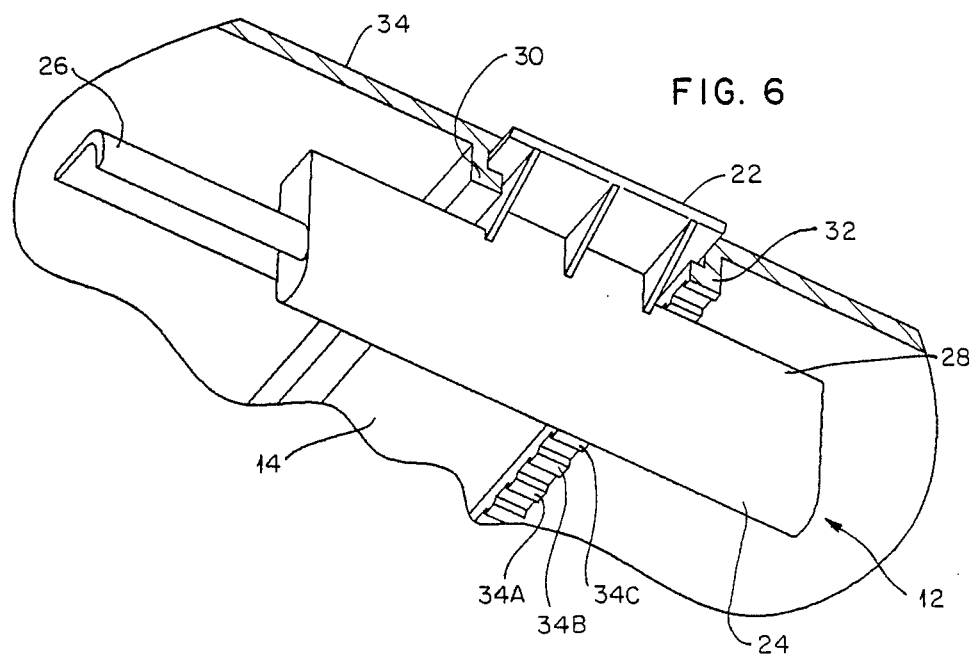

TILT MECHANISM FOR DISPLAY TERMINAL

FIELD OF THE INVENTION

The present invention relates to display terminals and more particularly to an inexpensive tilt mechanism for a display terminal.

DESCRIPTION OF THE PRIOR ART

Display terminal users often want to be able to adjust the tilt of their terminal for a variety of reasons. If glare from overhead lights is a problem, a user may tilt the terminal forward until the screen faces away from the lights or toward the floor. This is referred to as a negative tilt orientation. Alternatively, a user whose terminal is resting on a relatively low surface may wish to tilt the terminal backward until the screen faces toward the ceiling. This is referred to as a positive tilt orientation.

The mechanisms for allowing users to make this type of adjustment range from something as simple as a book placed beneath the terminal to something as elaborate as an electromechanical or even a hydraulic mechanism which allows an operator to tilt or swivel the terminal or to change its vertical elevation. Placing a book beneath the terminal may have the virtue of being cheap, but often isn't practical. For example, a user can't look at a book when his terminal is resting on it. Of greater consequence is the fact that a book, or any other makeshift support, may block the flow of needed cooling air through the terminal or may be accidentally dislodged. If the latter happens, the terminal obviously may be damaged when it crashes onto the primary supporting surface.

Less impromptu forms of terminal support may not possess the disadvantages of a book, but can add significantly to the cost of a terminal due to their complexity. A number of mechanisms have been divulged which provide not only tilt, but also swivel capability. Examples of these mechanisms may be found in U.S. Pat. Nos. 4,304,385, 4,365,779, 4,395,020, 4,410,159, 4,415,136, 4,453,687, 4,494,720, 4,500,060, 4,542,872 and 4,554,590.

While the tilt and swivel mechanisms disclosed in the above-listed patents or wlsewhere in the prior art vary considerably in their mechanical details, all are relatively complex due to the requirement for mechanical components capable of providing the swivel function.

Where a user does not have to be able to swivel a display terminal, potentially less expensive tilt-only mechanisms may be used. A number of different tilt mechanisms are disclosed in issued patents. Examples of such mechanisms can be found in U.S. Pat. Nos. 3,538,250, 3,740,011, 4,349,173, 4,368,867, 4,427,243, 4,471,931, 4,474,352, 4,524,940, 4,527,766, 4,533,105, 4,556,189 and 4,561,620.

While these known prior art mechanisms perform a basic tilt function in many different ways, most include a number of moving parts. This adds to the initial cost of manufacture and assembly while increasing the possibility of failure during normal terminal use.

SUMMARY OF THE INVENTION

The present invention is an inexpensive tilt mechanism for a display terminal. The tilt mechanism has a single movable part which reduces the initial cost and the possibility of failure during terminal use.

In a preferred embodiment, the mechanism makes use of a retaining means which extends from front to back at the bottom surface of the display terminal. The retaining means has at least one engageable surface. A movable terminal support includes a base plate which is received within the retaining means. The base plate can be moved along the path defined by the retaining means. A terminal supporting pedestal extends away from the base plate or toward any surface on which the terminal rests. The movable support includes a locking means which is adjacent to but disengageable from engageable surface of the retaining means. The locking means, when disengaged, permits selective movement of the movable support along the defined path. When engaged, the locking means holds the movable support in place.

BRIEF DESCRIPTION OF THE DRAWINGS

While the specification concludes with claims particularly pointing out and distinctly claiming that which is regarded as the prsent invention, details of preferred embodiments of the invention may be more readily ascertained from the following technical description when read in conjunction with the accompanying drawing wherein:

FIGS. 2, 3 and 4 illustrate different terminal orientations determined by different positions of a tilt mechanism:

FIG. 5 is a detailed perspective view of one embodiment of the movable support means;

FIG. 6 is a perspective view showing the movable support means in place within a retaining means formed on the bottom wall of the display terminal;

TECHNICAL DESCRIPTION

Figure 1:
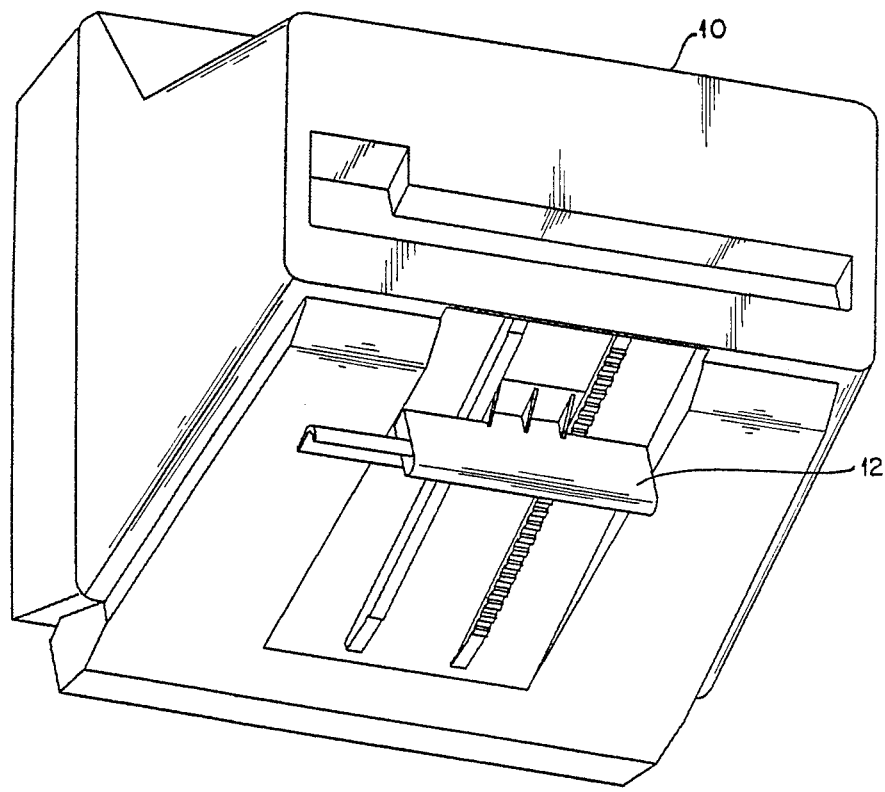
FIG. 1 is a perspective view of a display terminal looking towards the bottom surface of the terminal.

FIG. 1 is a perspective view showing the left side, rear and bottom surface of a display terminal 10. The orientation or tilt of a display terminal 10 can be adjusted by means of an inexpensive tilt mechanism including a movable support 12 which can be shifted along a retaining means 14 extending from the front to the back of the terminal 10 at its bottom surface. The position of the movable support 12 within the retaining means determines the orientation or tilt of the terminal 10.

Referring to FIG. 2, when support 12 is at or near the face 16 of terminal 10, the face is tilted toward a terminal supporting surface 18. If the movable support 12 is shifted towards a rear surface 20 of terminal 10, the face 16 can assume a zero tilt or vertical orientation as shown in FIG. 3. If the movable support 12 is moved closer to the rear surface 20, the terminal will assume a positive tilt orientation, as shown in FIG. 4.

FIG. 5 is a more detailed perspective view of the movable support 12. The movable support 12 includes a base plate 22 and a terminal supporting pedestal 24, preferably formed with a crate-like construction for strength purposes. The terminal supporting pedestal 24 includes an actuating lever 26 and a small upwardly extending ridge 28. The functions of the lever 26 and ridge 28 are described with reference to later figures.

FIG. 6 is a partial perspective view of the movable support 12 in position in the retaining means 14. A preferred embodiment of retaining means 14 comprises two parallel rails 30 and 32, preferably formed integrally with the bottom surface 34 of the display terminal 10. Each of the rails 30 and 32 has a generally L-shaped cross section to define a channel extending from the front to the back of the display terminal. The base plate 22 rides within the defined channel. The thickness of base plate 22 is less than the vertical dimension of the channel so the movable support 24 can move a limited vertical distance within the channel. In a preferred embodiment, rail 32 includes a bottom surface which may be engaged by movable support 24 to lock the support in position. In the illustrated embodiment, the engageable surface comprises a series of teeth 34A, 34B, 34C, etc. The ridged surface 28 on the movable support 12 can be received in a space between two adjacent teeth.

Figure 7:
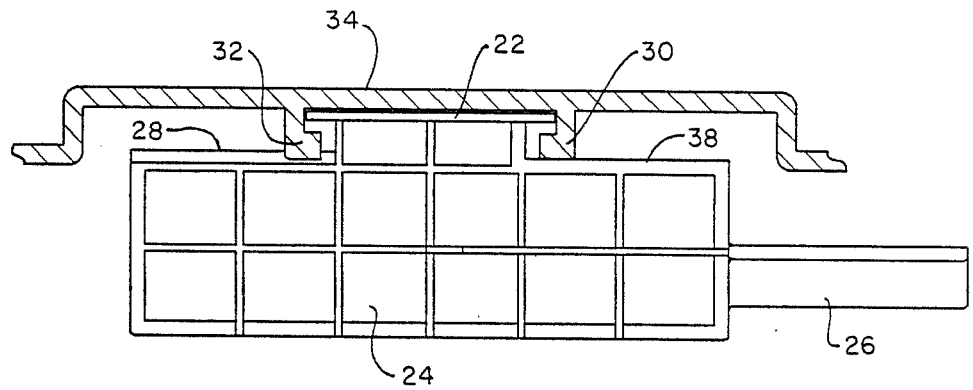
FIG. 7 is a plan view of the assembly shown in FIG. 6 with the movable support means being in an engaged or locked position.

FIG. 7 shows the movable support 12 in an engaged position. In this position, the upper surface of the base plate 22 and the lower surface of the pedestal 24 are generally parallel to the bottom surface 34 of the terminal while ridge 28 on pedestal 24 is trapped between two of the teeth on rail 32. Surface 38 on the pedestal 24 rests against the smooth bottom surface of the rail 30.

Figure 8:
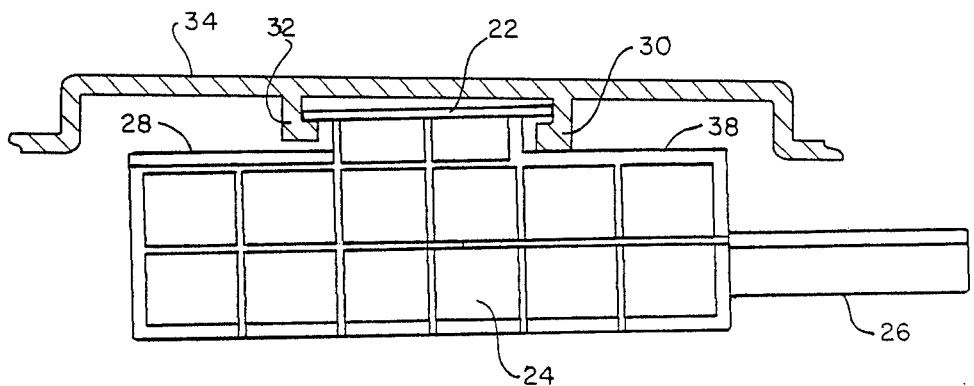
FIG. 8 is a plan view of the movable support means in a disengaged position in which it can be moved along a path defined by the retaining means.

To disengage the movable support so that it can be shifted for or aft in the channel defined by the L-shaped rail 30 and 32, a terminal user lifts lever 26 vertically as shown in FIG. 8. As lever 26 moves upwardly, the pedestal 24 pivots about the point of contact between the bottom surface of rail 30 and the surface 38 of pedestal 24. The pivotal movement allows ridge 28 to clear the teeth on the bottom surface of rail 32. As long as lever 26 is held at its uppermost vertical position, the movable support can be shifted along the channel defined by rail 30 and 32 to any desired position. When the desired position is reached, lever 26 is released. The weight of the terminal will cause the movable support to return to the engaged position shown in FIG. 7.

Figure 9:
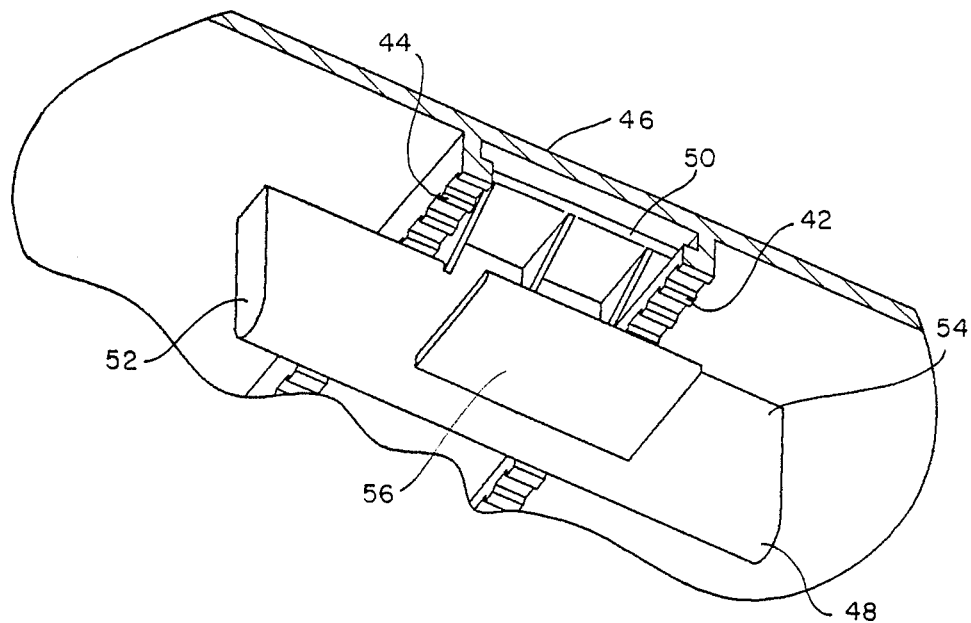
FIG. 9 is a perspective view of an alternate embodiment of the invention.

FIG. 9 is a partial perspective view of an alternate embodiment of the invention. In this embodiment, a retaining means 40 consists of two L-shaped rails 42 and 44, each of which has teeth formed along its bottom surface. As was the case with the embodiment described earlier, the retaining means 40 is preferably an integral part of a bottom wall 46 of a terminal housing. A movable support 48 includes a tab 56 extending from one side of movable support 48 and a base plate 50 which can be shifted along the channel defined by the rails 42 and 44. The thickness of the base plate 50 is less than the vertical dimension of the channel so that movable support 48 has a limited range of the vertical movement. The movable support 48 lacks any actuating level but includes shoulders 52 and 54 which can be received in the slots between the individual teeth on the bottom surface of the rails 42 and 44.

To adjust the tilt of the terminal equipped with this embodiment of the tilt mechanism, the operator lifts the terminal clear of its primary supporting surface. When the weight of the terminal is removed from the movable support, the vertical play of the base plate 50 within the channel allows shoulders 52 and 54 to drop clear of the toothed surfaces. The movable support 48 will slide forward in the channel with minimal urging by the operator. If the movable support is to be moved to the rear, the operator may have to depress tab 56 when pushing the movable support 48. Pressure on tab 56 will prevent the base plate 50 from rotating within the channel in such a way that shoulders 52 and 54 of movable support 48 come into unintended contact with the teeth on rais 42 and 44. When the desired position is reached, the terminal is lowered towards its primary supporting surface. The movable support 48 is locked into position when the shoulders 52 and 54 enter gaps between adjacent teeth on both rails.

While there have been described what are considered to be preferred embodiments of the invention, variations and modifications therein will occur to those skilled in the art. Therefore, it is intended that the appended claims shall be construed to include the described embodiments and all such variations and modifications as fall within the true spirit and scope of the invention.

I claim:

1. A tilt mechanism for a display terminal comprising:
   first and second parallel members defining a channel extending from the front of the display terminal toward the rear at the bottom surface of the display terminal, at least one of said parallel members having a movement-inhibiting surface; and
   a movable support having
   a base plate selectively movable within the channel defined by said first and second parallel members, and
   a terminal supporting pedestal extending from said base plate, said terminal supporting pedestal including a locking surface which may be brought into engagement with the movement-inhibiting surface when said base plate has reached a desired position within the channel.

2. A tilt mechanism as defined in claim 1 wherein said first and second parallel members are integral with the display terminal housing, each of said parallel members having a generally L-shaped cross section.

3. A tilt mechanism as defined in claim 2 wherein the movement-inhibiting surface comprises a toothed surface formed integrally at the bottom of one of said L-shaped parallel members.

4. A tilt mechanism as defined in claim 3 wherein the locking surface on said terminal supporting pedestal comprises an upwardly extending shoulder which may be received between two adjacent teeth on said toothed surface.

5. A tilt mechanism as defined in claim 4 further including a tab extending from said terminal supporting pedestal, said tab being depressed by an operator when the pedistal is being moved in one direction to prevent unintended rotation of the base plate within the channel during movement.

6. A tilt mechanism as defined in claim 3 further including an actuating handle extending from said terminal supporting pedestal, said actuating handle being used to disengage the locking surface on said terminal supporting pedestal from the toothed rack when the handle is moved vertically, thereby pivoting the movable support about a pivot point at the intersection of said movable support and the parallel member lacking the toothed rack.

7. A telt mechanism for a display terminal comprising:
   first and second parallel members having L-shaped cross sections, each said member extending downwardly from the bottom surface of the display terminal with the foot portion of the L extending toward the other of the terminal members to define a channel extending from the front toward the back of the display terminal, the foot portion of one of said members having a toothed surface and the foot portion of the other of said members having a smooth surface;

a movable terminal support comprising
  a generally rectangular base plate received within the channel defined by said parallel members,
  a supporting pedestal integral with said base plate and extending therefrom away from the bottom surface of the display terminal, said pedestal including an upwardly facing ridge transverse to the channel formed by said parallel members, said ridge normally being in engagement with the toothed surface of the L-shaped member, and
  an actuating handle extending from said pedestal, said handle being movable vertically to pivot the supporting leg about its point of contact with the smooth surfaced L-shaped member to remove the ridge from engagement with the toothed surface of the other L-shaped member when it is desired to move the pedestal within the channel.

* * * * *